(12) United States Patent
Novak et al.

(10) Patent No.: US 6,390,759 B1
(45) Date of Patent: May 21, 2002

(54) INTEGRATED BRAKE/TILT-RELEASE MECHANISM FOR A DOLLY WITH A PIVOTING CARRIAGE

(76) Inventors: William J. Novak, 9770 Cinnamon Dr., Omaha, NE (US) 68136; Doug S. Bailey, 2059 N. 61st St., Omaha, NE (US) 68104; Fred C. Casto, 13026 Southdale Dr., Omaha, NE (US) 68137

(*) Notice: Subject to any disclaimer, the term of this patent is extended or adjusted under 35 U.S.C. 154(b) by 0 days.

(21) Appl. No.: 09/476,077

(22) Filed: Dec. 30, 1999

(51) Int. Cl.[7] ............................. B62B 3/08; B62B 5/04
(52) U.S. Cl. ................... 414/430; 414/346; 414/469; 414/743; 414/911; 280/6.151; 280/79.11; 188/5
(58) Field of Search ............................ 414/343, 345, 414/346, 347, 396, 426, 428, 430, 469, 471, 473, 474, 476, 537, 589, 680, 684, 743, 911; 410/47, 49; 188/5, 6, 7, 32; 280/6.15, 6.151, 47.27, 47.28, 47.29, 47.34, 47.371, 79.11, 79.2, 79.3, 79.4, 79.6

(56) References Cited

U.S. PATENT DOCUMENTS

| | | | |
|---|---|---|---|
| 708,346 A | * 9/1902 | Grondin et al. | 280/47.34 X |
| 1,536,611 A | 5/1925 | Duke | 414/469 |
| 1,789,391 A | * 1/1931 | Roe | 414/469 X |
| 2,189,010 A | 2/1940 | Lewis | |
| 2,254,564 A | * 9/1941 | Caslake | 414/430 |
| 2,569,050 A | * 9/1951 | Gref et al. | 414/430 X |
| 3,111,915 A | * 11/1963 | Gray | 108/6 |
| 3,224,612 A | * 12/1965 | Olson | 414/430 |
| 3,285,447 A | 11/1966 | Junion | |
| 3,495,850 A | 2/1970 | Ziskal | |
| 3,879,053 A | * 4/1975 | Chvala | 280/79.11 X |
| 3,897,959 A | * 8/1975 | Haffner | 280/79.11 |
| 4,067,265 A | * 1/1978 | Watson | 280/79.3 X |
| 4,125,269 A | * 11/1978 | Kiel | 280/47.4 X |
| 4,240,773 A | 12/1980 | Terry | |
| 4,318,571 A | * 3/1982 | Vize | 303/71 |
| 4,582,178 A | * 4/1986 | Huneault | 188/109 |
| 4,593,883 A | * 6/1986 | Nelson | 414/911 X |
| 4,655,466 A | 4/1987 | Hanaoka | |

(List continued on next page.)

FOREIGN PATENT DOCUMENTS

| | | | |
|---|---|---|---|
| DE | 42 39 729 | * | 6/1994 |
| GB | 2201129 | * | 8/1988 |

*Primary Examiner*—Robert P. Olszewski
*Assistant Examiner*—Gerald J. O'Connor
(74) *Attorney, Agent, or Firm*—Morris, Manning & Martin

(57) ABSTRACT

An improved roll cart that allows an individual to move and transport a large roll of paper. The roll cart includes a rolling frame that supports a pivoting carriage for holding and stabilizing a large roll of paper. The pivoting carriage is pivotally attached to a frame so that the carriage can pivot within the frame to allow a roll of paper to be rolled on to or off of the carriage with minimal effort and without lifting or damaging the roll of paper. The roll cart also includes a unique combination braking/locking mechanism and can be securely maintained stationary with respect to a surface by engaging the brake portion of the mechanism. When the brake is engaged, rolling of the device is impeded and the carriage tilts to facilitate loading and unloading of a roll by rolling the roll on to or off of the carriage. When the brake is disengaged, the device is free to roll but the carriage is restricted from tilting by a locking mechanism. This combination braking/locking feature prevents the carriage from pivoting when the device is rolling, prevents inadvertent unloading of a roll and facilitates the safe transportation or large heavy rolls of paper. The present invention also provides a method for moving a roll of paper from one raised surface to another raised surface.

20 Claims, 5 Drawing Sheets

U.S. PATENT DOCUMENTS

| | | | |
|---|---|---|---|
| 5,035,445 A | * | 7/1991 | Poulin .................... 280/79.11 |
| 5,046,748 A | | 9/1991 | Oat-Judge |
| 5,052,877 A | | 10/1991 | Jääskeläinen et al. |
| 5,253,972 A | | 10/1993 | Drew et al. ................. 414/469 |
| 5,413,449 A | * | 5/1995 | Schoenherr et al. ........ 414/343 |
| 5,464,076 A | * | 11/1995 | Benedetto .................... 188/32 |
| 5,544,719 A | | 8/1996 | Boriani et al. |
| 5,618,152 A | * | 4/1997 | Andrews ................ 414/911 X |
| 6,010,296 A | * | 1/2000 | Enders ....................... 414/346 |
| 6,098,761 A | * | 8/2000 | Kooima et al. ....... 280/79.11 X |

* cited by examiner

INTEGRATED BRAKE/TILT-RELEASE MECHANISM FOR A DOLLY WITH A PIVOTING CARRIAGE

TECHNICAL FIELD

The invention relates generally to devices for moving large, heavy objects, and more specifically, to a device for moving a large roll of paper from a pallet to a desired location having a surface raised above the floor.

BACKGROUND OF THE INVENTION

Printers used in industrial and commercial applications, such as in paper mills and warehouses, often use a large paper roll having a hollow core as a starting material to print high volumes of letters and forms. These paper rolls are typically over three feet in diameter, and each one can weigh several hundred pounds or more. It is difficult, if not impossible, for an individual to move a roll of paper of this size without the use of powered machinery and without damaging the paper.

Large rolls of paper are usually handled or transported in a vertical position with the aid of the ordinary two-wheeled factory truck or by simply rolling the roll across the floor. Handling rolls of paper in this manner can cause considerable damage to the exposed paper along the outer surface of the roll, especially the outer edges of the roll. Because of the damage to the end of the roll, it is often necessary to cut off and throw away the outer layers of the paper. Sometimes the damage to a roll of paper is so great that a significant part of the roll is rendered entirely unfit for its intended use, resulting in a substantial loss of money and resources. No satisfactory means for allowing an individual to handle a single roll of paper has been available. It would be desirable to provide a convenient means and a method of handling and transporting a large roll of paper from a pallet to a desired location in a less cumbersome manner without requiring lifting of the roll or allowing the roll to contact the floor.

Attempts have been made to provide a device to facilitate the handling and transporting of large rolls of paper. U.S. Pat. No. 1,536,611 describes a truck skid for handling large rolls of paper. The truck skid provides a skid or an incline onto which a roll of paper must be moved in order to load the roll on the truck skid. Rolling the paper up the skid or incline requires a significant amount of physical effort by an individual. Furthermore, the truck skid is not configured to receive a roll of paper from a raised surface such as a pallet without raising or lowering the roll. Several of the truck skids described in U.S. Pat. No. 1,536,611 cannot be stacked on top of each other or otherwise arranged to save space when not in use and it would be inefficient and expensive to store and provide an inventory of several of the truck skids loaded with paper.

Thus, there is a need in the art for an improved device and an improved method of transporting a roll of paper that allows an individual to effectively and safely move a roll. There is a further need in the art for a device and a method that does not require lifting of or lowering of the roll of paper and that prevents the roll from contacting the floor. There is also a need for an improved device and method that is less cumbersome than prior devices and methods, that allow several devices loaded with paper to be stored in a minimal amount of floor space in order to provide a ready inventory of rolls of paper and that allows several empty, unloaded devices to be stacked one on top of another to save floor space.

SUMMARY OF THE INVENTION

The present invention is an improved roll cart that can be used for moving and transporting large rolls of paper. Through a unique configuration of its parts, in particular the location of a pivot and the use of a combination braking/locking mechanism, the device allows an individual to safely and easily move a roll of paper without damaging the paper, without the use of hydraulics or other complex machinery and without contacting the floor or other surfaces detrimental to the roll of paper. The device of the present invention can be operated by an individual of average strength to safely move a roll of paper without the use of hydraulics, electricity and other non-human power sources.

The roll cart includes a frame having means for allowing the frame to roll across a surface; a carriage having a first projection proximate a first end of the carriage and a second projection proximate a second end of the carriage; means for pivotally connecting the carriage to the frame; and a combination locking/braking mechanism including a braking portion and a locking portion. The combination locking/braking mechanism is configured such that when the brake portion of the combination locking/braking mechanism is engaged, the locking portion of the combination locking/braking mechanism is disengaged. On the other hand, when the locking portion of the combination locking/braking mechanism is engaged, the braking portion of the combination locking/braking mechanism is disengaged.

Stated otherwise, the roll cart includes a rolling frame that supports a pivoting carriage for holding and stabilizing a large roll of paper. The pivoting carriage is pivotally attached to the frame so that the carriage can pivot within the frame to allow a roll of paper to be rolled onto or off of the carriage with minimal effort and without lifting or damaging the roll of paper. The carriage supports and stabilizes a large roll of paper, desirably greater than two feet in diameter. The pivot point is strategically placed on the carriage so that the carriage normally rests on the frame in a gravitationally stable and substantially horizontal resting position. From this horizontal resting position, the carriage can pivot to a gravitationally unstable, tilted position wherein an inclined surface, stop or other projection at one end of the carriage pivots to below or flush with the top surface of the roll cart. The pivoting of the carriage is caused by rolling the paper roll onto the inclined surface, stop or other projection at the end of the carriage. Thus, a roll of paper can be loaded onto the carriage without lifting or damaging the roll of paper by rolling paper roll over the inclined surface, stop or projection, thereby causing the carriage to pivot so that the stop pivots below or flush with the frame. This feature minimizes damage to the outside of the roll of paper and minimizes the amount of effort required to roll the paper roll onto the carriage.

The roll cart can be securely maintained stationary with respect to a surface by engaging a brake. When the brake is engaged, rolling of the device is impeded and the carriage pivots freely to allow loading and unloading of a roll of paper by rolling the roll on to or off the carriage. When the brake is disengaged, a locking mechanism engages the carriage to prevent the carriage from tilting. When the brake is disengaged, the device is free to roll and the carriage is restricted from pivoting by the locking portion of the mechanism. This combination braking/locking feature is an alternate locking or braking feature that prevents the carriage from pivoting when the device is rolling, prevents inadvertent unloading of a roll and facilitates the safe transportation of large heavy rolls of paper. The roll cart can also be used for moving other objects besides rolls of paper, such as spools of wire, rolls of plastic film, and so forth.

The present invention further provides a method for moving a roll of paper that involves rolling the device to a raised surface upon which a roll of paper is located (such as a pallet), engaging the brake portion of the combination braking/locking mechanism, rolling a roll of paper from the raised surface onto one end of the device, tipping the carriage by further rolling the roll of paper over the leading edge of the carriage and onto the carriage and pivoting the carriage back to a stable position. The braking portion of the combination braking/locking mechanism can then be disengaged, thus, engaging the locking portion of the mechanism and preventing the carriage from pivoting. The device is now loaded with a roll of paper and can be safely transported and rolled to a desired location. To unload the roll of paper, the brake is engaged and the lock is disengaged thereby allowing the roll of paper to be rolled off the carriage and desirably on to a device having a similarly raised surface.

It is an object of the present invention to provide a roll cart and a method for handling and transporting rolls of paper and other objects, especially when of similar shape, from the raised surface of a pallet to a cart to a printer without lifting the roll or allowing the roll to contact the floor and with a minimum of effort and damage to the object being handled.

It is also an object of the invention to provide a roll cart that is capable of being stacked when empty and stored in a minimal amount of space and that can be arranged next to other such loaded devices in a minimal amount of floor space.

The various aspects of the present invention may be more clearly understood and appreciated from a review of the following detailed description of the disclosed embodiments and by reference to the appended drawings and claims.

DETAILED DESCRIPTION OF THE EXEMPLARY EMBODIMENTS

Figure 1:
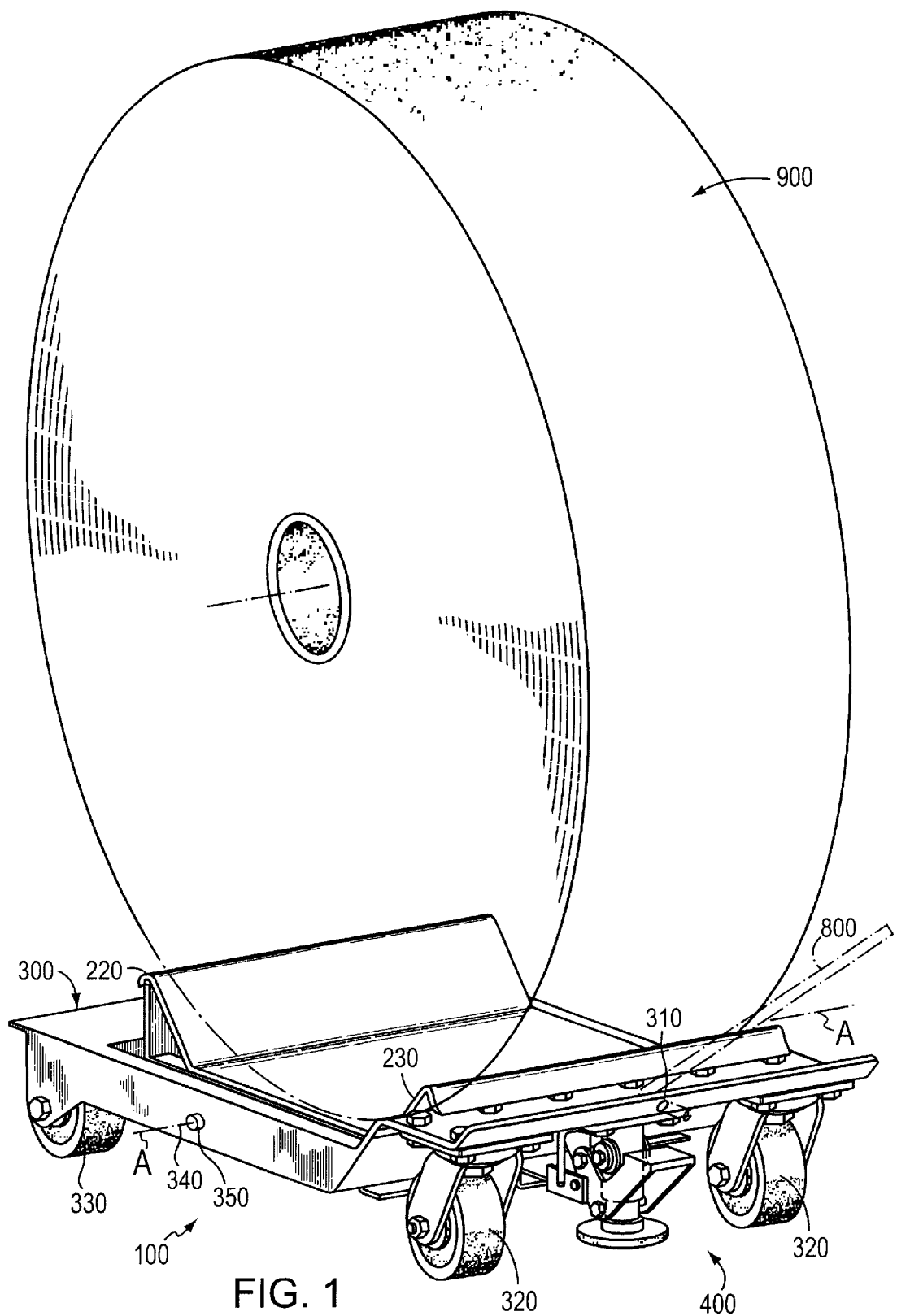
FIG. 1 is a perspective view of an exemplary embodiment of a roll cart according to the present invention.

An exemplary embodiment of the present invention is an improved roll cart device that can be used for moving a large roll of paper from a pallet in a warehouse to a printer at another location. These large rolls of paper can be over fifty inches in diameter and weigh over one half of a ton.

Furthermore, these rolls of paper are top heavy and are often difficult to move manually without damaging the outer layers of paper. The outside of a roll of paper is often damaged during moving, particularly when rolled on the floor. The damaged paper must be removed from the roll and becomes waste. The improved roll cart of the present invention provides a safe and efficient method of moving a roll of paper easily while minimizing damage to the paper. The device includes a pivoting carriage that stabilizes a large roll of paper and permits easy loading and unloading of the roll. The carriage is pivotally attached to a frame so that the carriage can tilt and allow a roll of paper to be rolled onto or off of the carriage without lifting the roll. The carriage also includes two inclined surfaces, stops or other projections, one at each end of the carriage, to stabilize the paper roll. The pivot point is strategically placed on the carriage so that the carriage normally rests on the frame in a gravitationally stable and substantially horizontal resting position. From this position, the carriage can tilt or pivot to a gravitationally unstable position by applying force or weight to the leading edge of the carriage. In this tilted position, the inclined surface, stop or other projection pivots to a level below or flush with the top surface of the roll cart, so that a roll of paper can be loaded onto the carriage with lifting the roll of paper over the inclined surface, stop or projection. This tilting feature minimizes damage to the outside of the roll of paper and minimizes the amount of effort required to load and unload the roll of paper on to and off of the roll cart.

The device can be securely maintained stationary with respect to a surface by engaging a brake. When the brake is engaged, rolling of the cart is impeded and the carriage pivots freely to allow loading or unloading of a roll by rolling the roll on to or off of the carriage. When the brake is disengaged, a locking mechanism engages the carriage to prevent the carriage from tilting. When the brake is disengaged, the cart is free to roll but the carriage is restricted from tilting or otherwise pivoting by the locking portion of the mechanism. This combination braking/locking feature not only prevents the carriage from pivoting when the device is rolling, it also prevents inadvertent unloading of a roll and facilitates the safe transportation of large heavy rolls of paper. The roll cart can also be used for moving other objects, particularly large objects of similar shape such as spools and rolls of other materials.

The present invention also provides a method for moving a roll of paper from one raised surface to another raised surface that involves rolling the cart to a first raised surface upon which a roll of paper is located, engaging the brake portion of the combination braking/locking mechanism, rolling the roll of paper from the first raised surface on to one end of the cart, tipping the carriage by further rolling the roll of paper over the leading edge of the carriage and onto the carriage, and then pivoting the carriage back to a stable position. The braking portion of the combination braking/locking mechanism can then be disengaged, engaging the locking portion of the combination braking/locking mechanism and preventing the carriage from pivoting. The cart is then loaded with a roll of paper and can be safely maneuvered and rolled to a desired location. To unload the roll of paper, the brake is engaged, the lock is disengaged and the roll of paper can be rolled off the carriage and, desirably, on to another raised surface.

Turning now to the drawings, in which like numerals reference like elements throughout the several figures, an exemplary embodiment for implementing the present invention is described.

Figure 2:
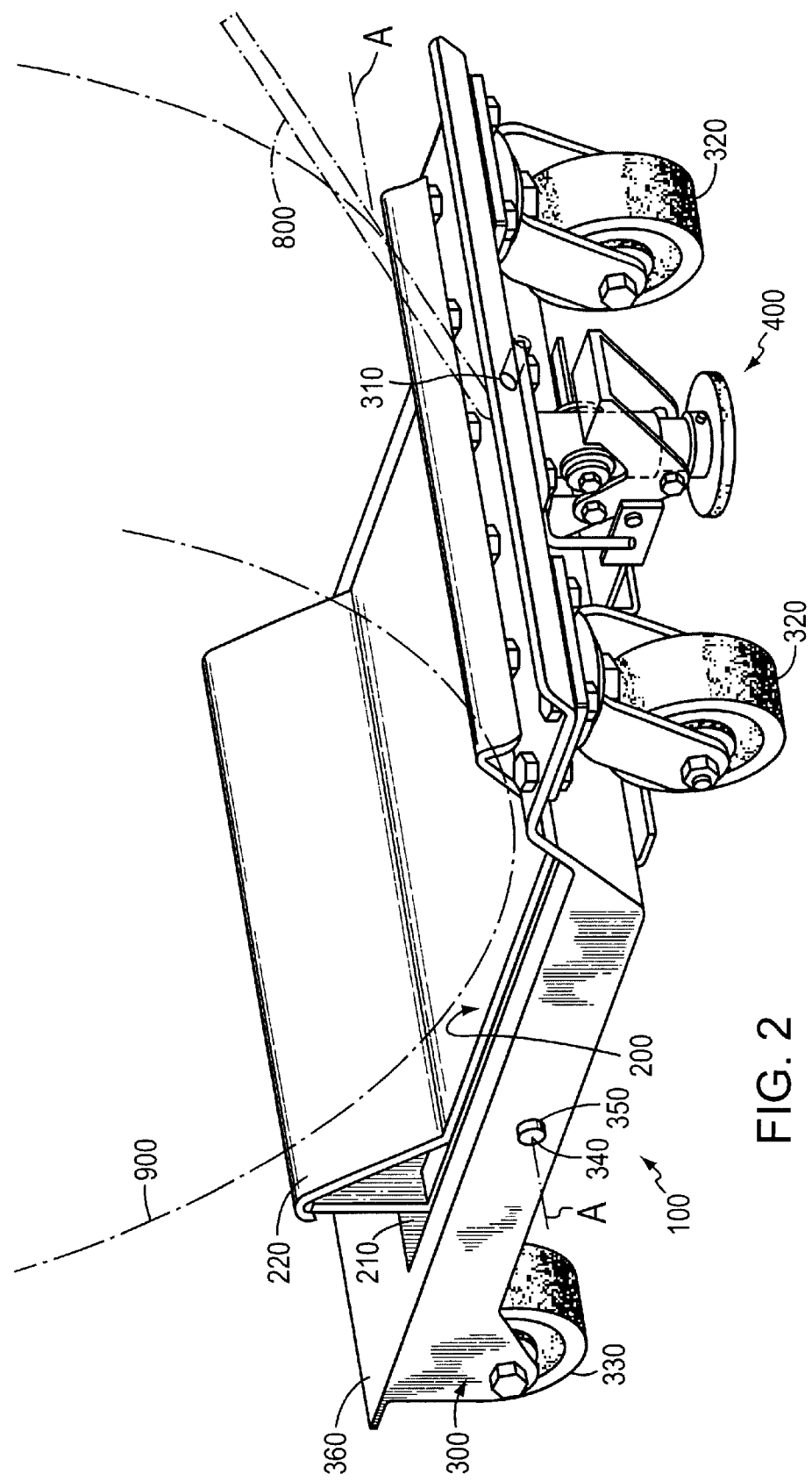
FIG. 2 is an enlarged perspective view of the roll cart of FIG. 1.

FIGS. 1 through 6 show an exemplary device, or roll cart 100 illustrating the present invention. Turning now to FIG. 1, the device 100 is shown in perspective, loaded with a large roll of paper 900. The large roll of paper 900 can be used to print a large number of documents without having to change rolls frequently. Advantageously, several of the devices 100 of the illustrated embodiment can be loaded with paper and lined up next to each other in a printing room to provide a ready inventory of paper for printing. In FIGS. 1 and 2, the device 100 is also shown with a partially illustrated means for pulling 800 the device, or roll cart 100, inserted through a hole 310 in the device 100. The means for pulling 800 can be any device that can be used to push or pull the roll cart 100 and includes, but is not limited to, a removable hook, a T-grip and other similar devices (not illustrated). In a preferred embodiment, the hole 310 is provided in the device 100 so that the means for pulling 800 can be inserted through the hole 310 and used by an individual (not illustrated) to pull the device 100 to a desired location. The means for pulling 800 is typically used when the device 100 is empty so that an individual can pull an empty cart without having to bend down. A roll cart 100 that is loaded with the paper roll can be pushed and maneuvered to a desired location by pushing on the roll that is loaded on the roll cart 100. A second hole (not illustrated) can be provided at the end of the cart opposite the end on which the first hole 310 is provided, so that more than one roll cart 100 can be linked together and pulled in a train-like fashion.

Figure 3A:
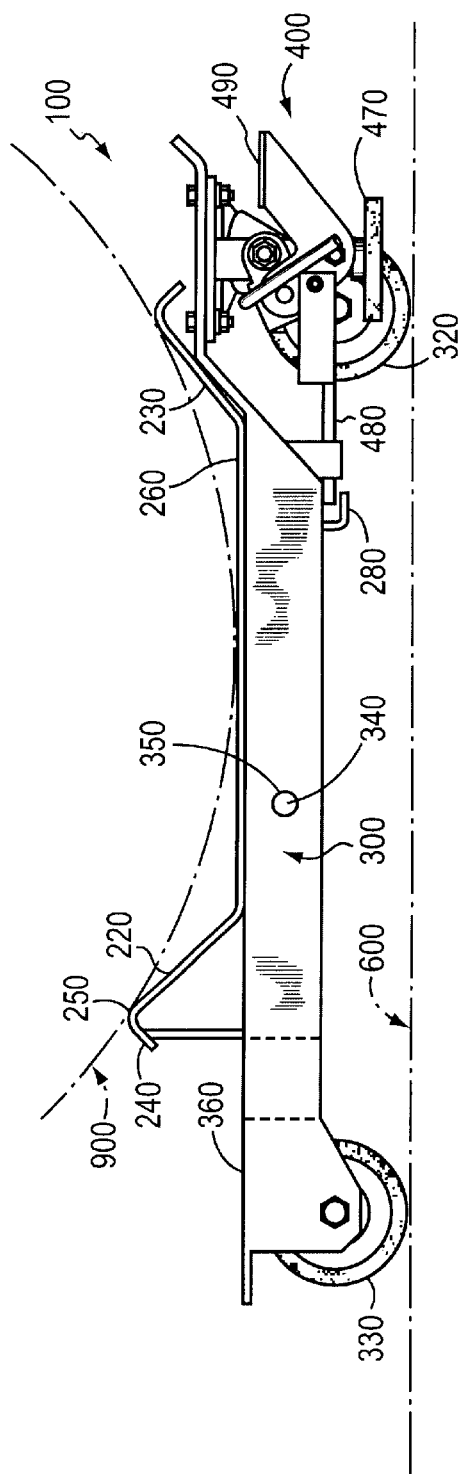
FIG. 3a is a side view of the roll cart of FIG. 1.

The roll of paper 900 is shown resting on a carriage 200 that is supported on a rolling frame 300. Although, the frame 300 is shown to be rectangular-shaped in the Figures, it can be any shape that allows the device to have the features that will be described. The device 100 includes means for allowing the device to travel or roll across a surface 600 (FIG. 3a). In the illustrated embodiment, the means for allowing the device 100 to travel or roll across a surface includes two pairs of wheels 320 and 330. However, the means for allowing the device 100 to roll or otherwise travel across the surface includes any means used to facilitate the movement of an object over a surface and includes, but is not limited to, wheels, casters, tracks, rollers, bearings and the like. In the illustrated exemplary embodiment, the frame 300 rests on the first pair of wheels 320 that freely rotate to allow for steering of the device 100 and a second pair of wheels 330 that are stationary, much like on a conventional shopping cart. In this desirable embodiment, the wheels 320 pivot about a vertical axis and are used for steering the device 100. It is also desirable to provide the means for pulling 800 the device 100 and the hole 310 at the end of the device having the steerable wheels 320.

Figure 3B:
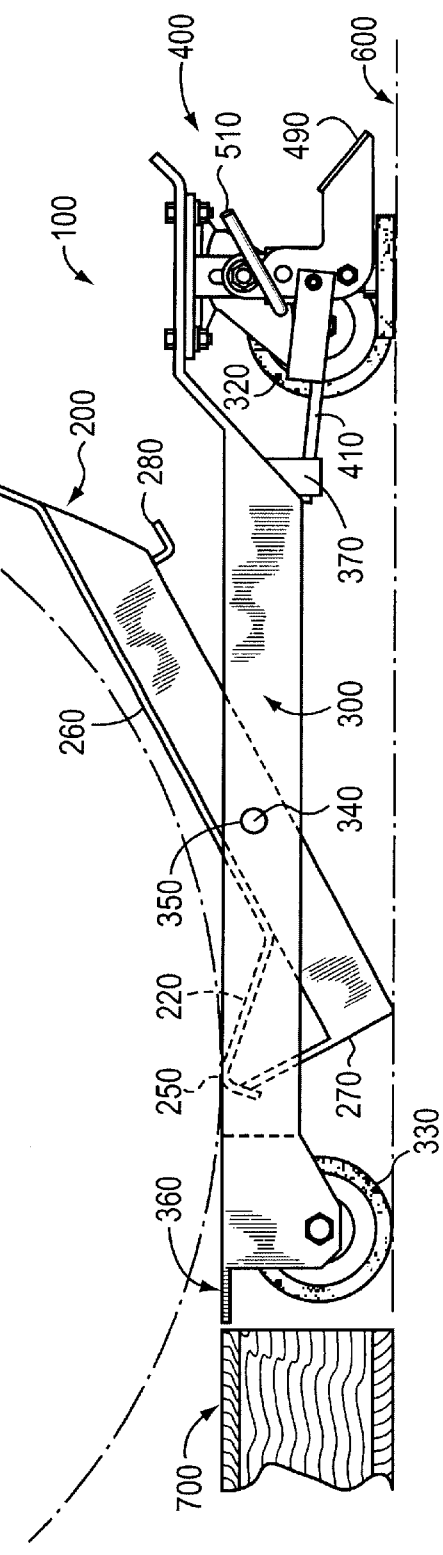
FIG. 3b is a side view of the roll cart of FIG. 1.

In the illustrated embodiment, the frame 300 is a one piece heavy gauge steel chassis that includes a central, rectangular opening 210 in which a carriage 200 is fitted. As shown in FIGS. 2 and 3a–b, the carriage 200 includes a first inclined surface 220 at one end of the carriage and a second inclined surface 230 at the other end of the carriage 200. The inclined surface 220 includes an opposing inclined surface 240 that faces away from the center of the carriage 200 and toward the end of the carriage. The inclined surface 240 acts a leading edge and includes a top 250. The carriage 200 is designed to support and stabilize the large roll of paper 900 and is pivotally attached to the frame 300 so that the carriage can pivot about a horizontal axis, A—A at a point 340. The carriage 200 is attached to the frame 300 by a means for pivotally attaching the carriage 200 to the frame 300. The means for pivotally attaching the carriage 200 to the frame 300 can be an axle, a pair of bolts, a pair of pins or other like device or devices 350 that are used to pivotally attach one item to another item. In a particularly desirable embodiment, the carriage 200 is pivotally attached to the frame 300 at the point 340 proximate the first inclined surface 220 of the carriage 200, so that the carriage 200 is pivotable horizontally about axis A—A. The carriage 200 normally rests on the frame 300 in a gravitationally stable and substantially horizontal position as illustrated in FIG. 3a. When the weight of the roll of paper 900 is applied to the end of the carriage proximate the inclined surface 240, the weight of the roll 900 pivots or tilts the carriage 200 to accept the roll 900 as illustrated in FIG. 3b. Desirably, a top surface of the frame 360 is about the same height as a standard pallet 700 so that a roll of paper 900 can be rolled directly off of the pallet 700 and onto the device 100 without raising or lowering the roll of paper 900. A standard pallet is typically about four and one-half inches in height. Therefore, it is desirable that the height from the bottom of the wheels 330 to the top surface 360 of the frame 300 is also about four and one-half inches. Thus, the roll of paper 900 can be rolled off the pallet 700, over the frame 300, over the top surface 360 and onto the carriage 200 as illustrated in FIG. 3b with minimal effort from the user. It is also desirable to design the height of the frame so that the frame can roll over an OSHA approved ramp (not illustrated).

A key feature of the exemplary device 100 is that the carriage 200 pivots to accept the roll 900 and includes two inclined surfaces, stops or other projections 220 and 230, one at each end of the carriage, to stabilize the large diameter roll of paper 900. Desirably, the inclined surfaces 220 and 230 and a generally flat surface 260 of the carriage 200 there between, are arranged so that the roll of paper 900 contacts all three surfaces 220, 230 and 260 and is stabilized by or cradled by the three surfaces as illustrated in FIG. 3a.

In yet another desirable embodiment, the carriage 200 includes a downward extending portion 270 that contacts the floor 600, also illustrated in FIG. 3b, and prevents the carriage 200 from tilting so far that the roll of paper 900 would fall down into the carriage 200. The length of the downwardly extending portion 270 or the thickness of the carriage 200 is desirably selected so that carriage 200 pivots enough for the top 250 of the inclined surface 220 to be approximately flush with or just below the top surface 360 but does not pivot so far that the top 250 of the inclined surface 220 is substantially lower than the top surface 360 of frame 300. In the tilted, unstable position, the roll of paper 900 can be easily and smoothly rolled on to or off of the carriage 200 without a significant change in height, without lifting or lowering the roll of paper 900 and without damaging the outside of the roll of paper.

Figure 4:
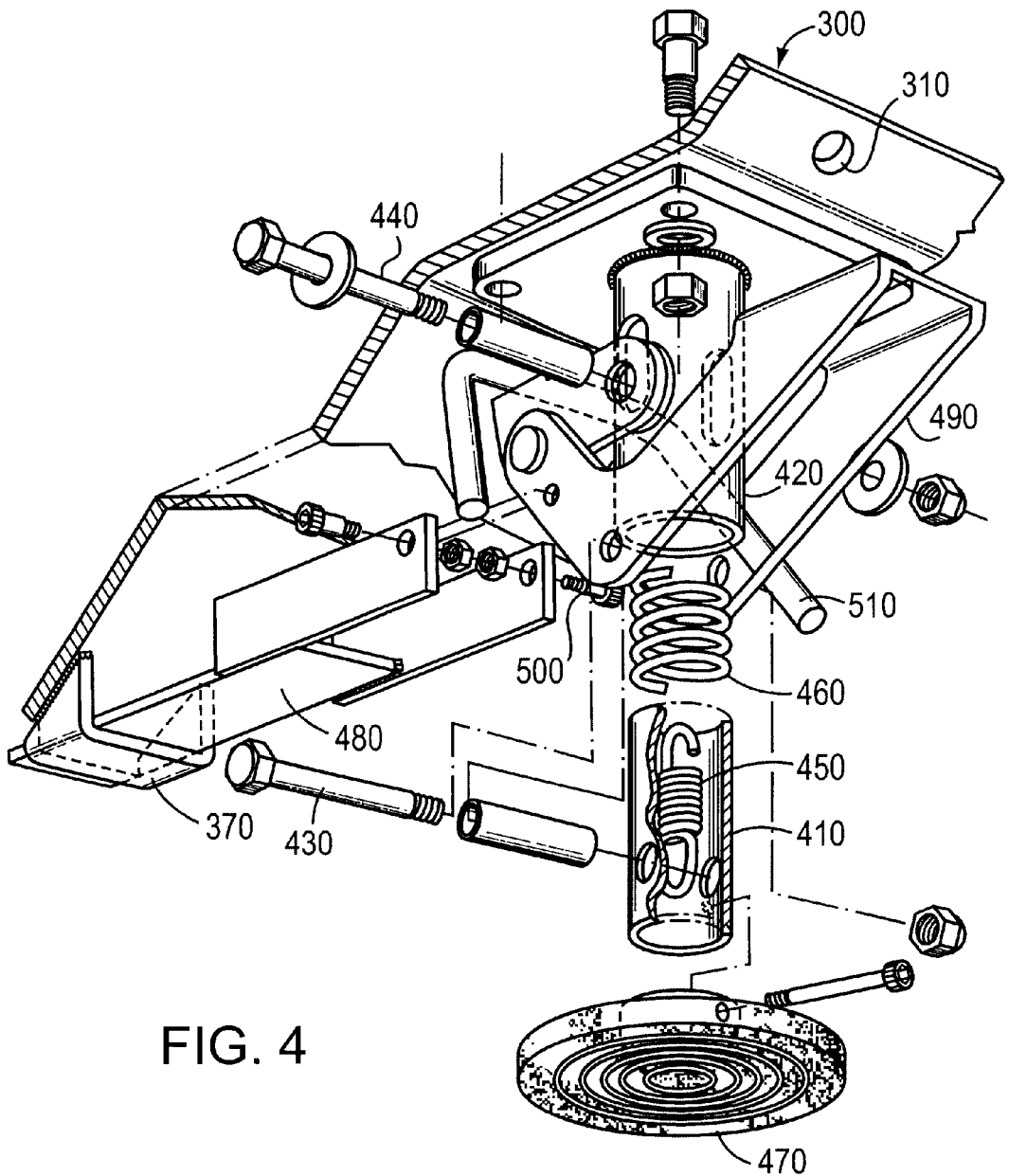
FIG. 4 is a detailed, exploded view of an exemplary combination braking/locking mechanism of the present invention.
Figure 5:
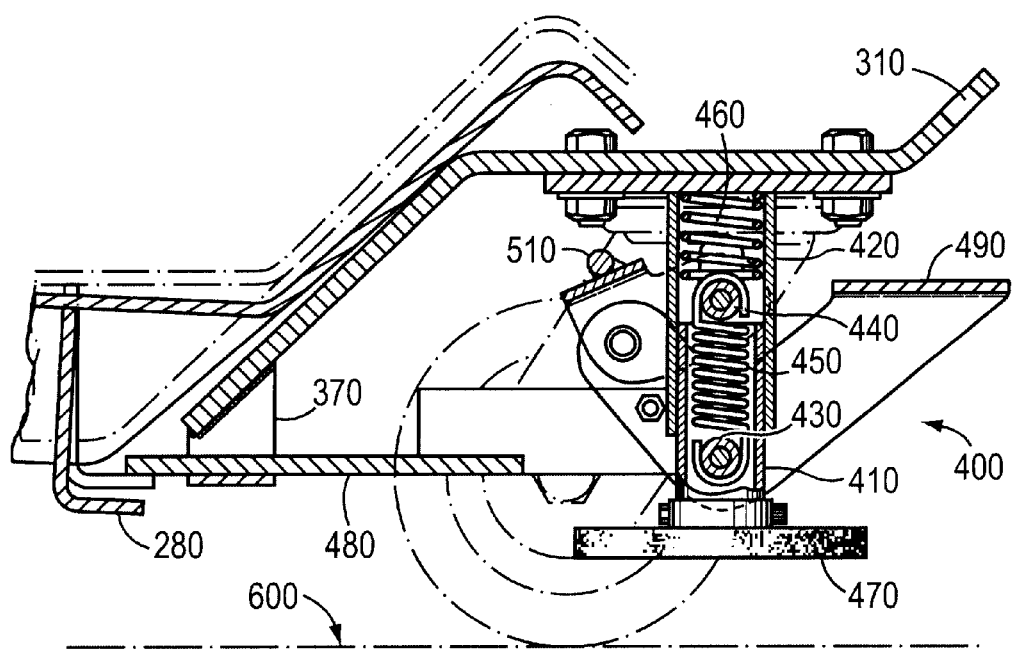
FIG. 5 is an enlarged, fragmentary section of the combination braking/locking mechanism of FIG. 4.
Figure 6:
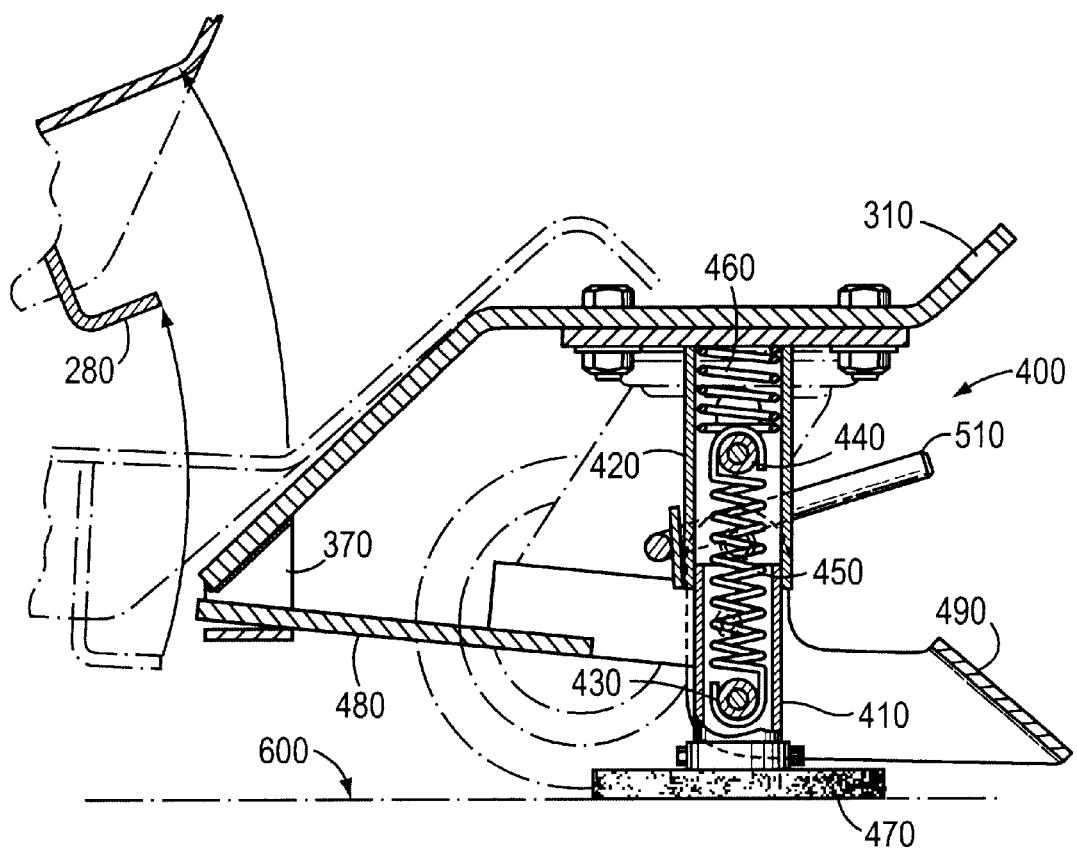
FIG. 6 is an enlarged, fragmentary section of the combination braking/locking mechanism of FIG. 4.

Another key feature of the invention is a combination braking/locking mechanism 400, an exemplary embodiment of which is illustrated in detail in FIGS. 4, 5 and 6. FIG. 4 is a detailed exploded view illustrating the individual components of the exemplary combination braking/locking mechanism 400 of the present invention. The combination braking/locking mechanism 400 includes both means for restricting movement of the device 100 across a surface and means for restricting the tilting or otherwise pivoting of the carriage 200 relative to the frame 300 that function in an alternative manner. Desirably, the combination braking/locking mechanism 400 also includes separate means engaging the brake and for disengaging the brake. FIG. 5 is an enlarged fragmentary section of the combination braking/locking mechanism 400 illustrating the locking portion of the mechanism in the engaged position and the brake portion of the mechanism in the up, disengaged, position. In the position illustrated in FIG. 5, the device 100 can roll freely across the surface 600 but the carriage 200 is restricted from pivoting or tilting by a locking mechanism and is in a gravitationally stable, substantially horizontal position. FIG. 6 is a similar enlarged fragmentary section of the combination braking/locking mechanism 400 illustrating the locking portion of the mechanism in the disengaged position and the brake portion of the mechanism in the down, engaged, position. In the position illustrated in FIG. 6, the carriage 200 is free to pivot or tilt but the device 100 is restricted from rolling across the surface 600 by the brake portion of the mechanism.

The combination braking/locking mechanism 400 of the illustrated, exemplary embodiment is a modified 4-inch floor brake assembly for a hand truck, model no. 66027756098, that was purchased from MSC. The brake assembly includes two interfitting, telescoping cylinders 410 and 420 connected to each other with bolts or pins 430 and 440 and springs 450 and 460 so that one cylinder can move within the other cylinder. To the lowermost cylinder 410 is attached a brake pad 470 for contacting the floor surface 600 and restricting movement of the device 100. Although the braking/locking mechanism 400 is illustrated as working in an alternating fashion where in only one engages at any one time, it may be desirable to provide a roll cart 100 in which a brake and a lock may be engaged simultaneously to provide a stationary cart 100 that is loaded with the roll 900 that is in a stable locked position.

The brake assembly was modified by adding a locking bar 480 to engage a portion 280 of the carriage 200 and prevent the carriage 200 from pivoting. In the exemplary embodiment illustrated, the portion 280 of the carriage is an L-shaped extension extending from the underside of the carriage 200 that the locking bar 480 can extend into to prevent the carriage 200 from pivoting or otherwise tilting. However, the portion 280 of the carriage can be of other configurations including, but not limited to, a U-shaped extension, a slot or a hole into which the locking portion of the combination braking/locking mechanism 400 can extend or otherwise engage (not illustrated). The locking bar 480 is connected to a pedal 490 by a bolt 500. The pedal 490 is attached to the brake pad 470 and can be depressed to lower the brake pad 410 to the surface 600 and to also simultaneously pull the locking bar 480 away from or otherwise disengage the locking bar 480 from the carriage so that the carriage can tilt. The brake assembly 400 also includes a lever 510 for raising the brake pad 470 from the down, brake engaged position while simultaneously engaging the locking bar 480 with the portion 280 of the carriage 200. In yet another desirable embodiment, the frame 300 further includes a guide 370 that supports and accurately guides the locking bar 480 into the portion 280 of the carriage.

Although the exemplary embodiment has been described as including the combination braking/locking mechanism 400 (i.e. a braking mechanism that works in cooperation with a locking mechanism), it will be understood that the device 100 can be modified so that the braking mechanism 400 and the locking mechanism act independently and can be separately engaged or disengaged. FIGS. 3a and 3b illustrate the cooperation of the tilting of the carriage 200 for loading or unloading of the paper roll 900 and the operation of the combination/locking brake mechanism 400. As described above, the carriage 200 can tilt to facilitate the loading and unloading of the roll 900 on to and off of the carriage 200, and, ultimately, the device 100. FIG. 3a is side view of the device of FIG. 1 loaded with the roll of paper 900, with the brake disengaged and with the carriage 200 in a locked position. FIG. 3b is a similar side view of the device of FIG. 1 but with the brake disengaged and with the carriage 200 in a tilted position. The height of the frame 300 can be configured to receive the roll 900 from the conventional pallet 700, as shown in FIG. 3b. Because the rolls of paper 900 are typically shipped on pallets, the device 100 enables an individual to handle and transport the roll of paper 900 without lifting or otherwise raising or lowering the roll of paper 900. Advantageously, the device 100 when loaded with the roll of paper 900 has a low center of gravity.

More advantageously, several of the loaded devices 100 can be lined up to provide a ready inventory of paper and several empty devices can be vertically stacked upon one another when not in use to save storage space. Particularly, in the exemplary embodiment illustrated in the Figures, the devices 100 are configured so that one device can be stacked on top of another similar device by laying the wheels on one end of the second device on the top of the opposed end of the first device. In this manner, more than one similar devices can be stacked vertically in same the floor space required for one such device.

The present invention also provides a method for moving a roll of paper from one raised surface, such as a pallet upon which such rolls are delivered, to another raised surface, such as a printer or an unwinding device on a printer. The method involves rolling the device 100 to a first raised surface upon which a roll of paper is located, e.g. a pallet, engaging the brake portion of the combination braking/locking mechanism 400, rolling a roll of paper from the pallet onto one end of the device, tipping the carriage 200 from a stable, substantially horizontal position to a tilted position by further rolling the roll of paper over the leading edge of the carriage, further rolling the roll of paper onto the carriage and pivoting the carriage back to the stable position, then disengaging the braking portion of the combination braking/locking mechanism and engaging the locking portion of the combination braking/locking mechanism that prevents the carriage from pivoting. The device is then safely loaded with a roll or paper and can easily be handled and maneuvered by an individual. The method may also include the use of a means for pulling the device, including but not limited to, a T-grip, a hook, a leash or any other similar device that can be inserted into the hole 310 and used to pull or to push the device 100. Several devices loaded in such a manner can be lined up in small area near the area the paper will be needed to provide a ready inventory of paper. Such inventorying can be used to minimize down time between changing rolls of paper on a printer.

The device is 100 unloaded by rolling the device to a second raised surface upon which the roll of paper is to be unloaded, engaging the brake portion of the combination braking/locking mechanism 400, tipping the carriage 200 from the stable position by rolling the roll of paper 900 over one of the projections, stops or raised surfaces on the surface of the carriage, and rolling the roll of paper off of the carriage and onto the second raised surface upon which the roll of paper is to be unloaded. The braking portion of the combination braking/locking mechanism can now be safely disengaged and the device rolled away from the raised surface upon which the roll of paper was unloaded. The empty device can be stacked vertically upon one or more similarly shaped devices with the wheels of the top device laying over the opposing wheels and on the surface of the lower device.

Other alternative embodiments will become apparent to those skilled in the art to which an exemplary embodiment pertains without departing from its spirit and scope. Accordingly, the scope of the present invention is defined by the appended claims rather than the foregoing description.

What is claimed is:

1. A roll cart device, comprising:
   a frame having a means for allowing the frame to roll across a surface;
   a carriage having a first projection proximate a first end of the carriage and a second projection proximate a second end of the carriage;
   a means for pivotally connecting the carriage to the frame; and a combination locking/braking mechanism comprising a braking portion and a locking portion, the combination locking/braking mechanism configured such that when the braking portion of the combination locking/braking mechanism is engaged the locking portion of the combination locking/braking mechanism is disengaged and when the locking portion of the combination locking/braking mechanism is engaged the braking portion of the combination locking/braking mechanism is disengaged.

2. The roll cart device of claim 1, wherein the combination locking/braking mechanism further comprises a first means for engaging the braking portion of the combination locking/braking mechanism and disengaging the locking portion of the combination locking/braking mechanism.

3. The roll cart device of claim 2, wherein the first means for engaging the braking portion of a combination locking/braking mechanism and disengaging the locking portion of a combination locking/braking mechanism comprises a pedal.

4. The roll cart device of claim 2, wherein the combination locking/braking mechanism further comprises a second means for engaging the locking portion of the combination locking/braking mechanism and disengaging the braking portion of the combination locking/braking mechanism.

5. The roll cart device of claim 4, wherein the second means for engaging the locking portion of the combination locking/braking mechanism and disengaging the braking portion of the combination locking/braking mechanism comprises a U-shaped lever that swings to an upward position when the braking portion of the combination locking/braking mechanism is engaged and can be depressed to disengage the braking portion of the combination locking/braking mechanism.

6. The roll cart device of claim 1, wherein the combination locking/braking mechanism further comprises a locking bar, the carriage further comprises a means for engaging the locking bar; and the frame further comprises a means for supporting the locking bar and guiding the locking bar to engage the means for engaging the locking bar when the locking portion of the combination locking/braking mechanism is engaged.

7. The roll cart device of claim 6, wherein the means for engaging the locking bar comprises an extension attached to the carriage, and the means for supporting the locking bar and guiding the locking bar comprises a U-shaped extension attached to the frame.

8. The roll cart device of claim 1, wherein the first projection and the second projection of the carriage are configured to stabilize a roll of paper.

9. The roll cart device of claim 1, wherein the carriage comprises a downwardly extending portion to prevent the first projection of the carriage from tilting below the frame.

10. A device for supporting and stabilizing a roll of paper, the device comprising:
a frame, the frame comprising a central open portion and means or allowing the frame to roll across a surface;
a carriage having a first projection and a second projection separated by a surface for supporting and stabilizing a roll of paper, the carriage further comprising a means for engaging a lock, the carriage connected to the frame such that the carriage fits in the central open portion of the frame and pivots about a horizontal axis; and
a combination locking/braking mechanism, the combination locking/braking mechanism comprising: a locking portion that selectively engages or disengages the means for engaging a lock, preventing the carriage from pivoting when the locking portion is engaged; and, a braking portion that restricts movement of the device when the locking portion is disengaged.

11. The device of claim 10, wherein the combination locking/braking mechanism comprises
a first pedal for engaging a brake and disengaging a lock, and
a second pedal for disengaging the brake and engaging the lock.

12. The device of claim 10, wherein the carriage comprises a sheet of metal and the first projection comprises a first incline proximate a first end of the sheet of metal and the second projection comprises a second opposed incline at a second opposed end of the sheet of metal.

13. The device of claim 10, wherein the carriage further comprises a downwardly extending portion to prevent the carriage from tilting below the frame.

14. The device of claim 10, wherein the second pedal comprises a U-shaped lever that wraps around the first pedal and can be depressed from either side of the first pedal.

15. The device of claim 10, wherein the means for engaging a lock comprises an L-shaped extension extending from the carriage.

16. A method for moving a roll of paper, the method comprising the steps of:
rolling a device to a first raised surface upon which a roll of paper is located,
engaging a braking portion of a combination braking/locking mechanism, the combination braking/locking mechanism impeding the rolling of the device,
rolling the roll of paper from the first raised surface onto one end of the device,
tipping a carriage from a stable position by further rolling the roll of paper over a leading edge of the carriage,
further rolling the roll of paper onto the carriage and pivoting the carriage back to the stable position,
disengaging the braking portion of the combination braking/locking mechanism, thereby engaging a locking portion of the combination braking/locking mechanism that prevents the carriage from pivoting, and
rolling the device and the roll of paper to a desired location.

17. The method of claim 16, further comprising the steps of:
rolling the device to a second raised surface upon which the roll of paper is to be unloaded,
engaging the braking portion of a combination braking/locking mechanism and simultaneously disengaging the locking portion of the braking/locking mechanism,
tipping the carriage from the stable position by rolling the roll of paper over the leading edge of the carriage, and
rolling the roll of paper off of the carriage and onto the second raised surface upon which the roll of paper is to be unloaded.

18. The method of claim 17, further comprising the step of:
disengaging the braking portion of the combination braking/locking mechanism, and
rolling the device away from the raised surface upon which the roll of paper is to be unloaded.

19. The method of claim 18, wherein the method further comprises the step of storing the device by stacking the device upon a plurality of such devices.

20. The method of claim 16, further comprising the step of rolling the device loaded with a roll of paper to a location having a plurality of similar devices loaded with similar rolls of paper to provide an inventory of rolls of paper.

* * * * *